United States Patent [19]
Jinnouchi

[11] Patent Number: 5,584,181
[45] Date of Patent: Dec. 17, 1996

[54] WASTE GATE STRUCTURE OF A TURBOCHARGER

[75] Inventor: Kazuharu Jinnouchi, Toyota, Japan

[73] Assignee: Aisin Seiki Kabushiki Kaisha, Aichi-pref., Japan

[21] Appl. No.: 581,720

[22] Filed: Dec. 28, 1995

[30] Foreign Application Priority Data

Dec. 28, 1994 [JP] Japan ................................ 6-327104

[51] Int. Cl.$^6$ ............................................. F02B 37/12
[52] U.S. Cl. .................................................. 60/602
[58] Field of Search ....................... 60/600–603

[56] References Cited

U.S. PATENT DOCUMENTS 3,994,620  11/1976  Spraker et al. ............................ 60/602

FOREIGN PATENT DOCUMENTS 34765   9/1981   European Pat. Off. ................ 60/602
627550  12/1994  European Pat. Off. ................ 60/602
54-19007  2/1979  Japan ..................................... 60/602
60-22024  2/1985  Japan ..................................... 60/602

*Primary Examiner*—Michael Koczo
*Attorney, Agent, or Firm*—Hazel & Thomas

[57] ABSTRACT

A waste gate structure of a turbocharger includes a turbine housing having a turbine rotor rotated by exhaust gas. An exhaust gas inlet is formed in the turbine housing and communicates with an inlet of the turbine rotor. An exhaust gas outlet is formed in the turbine housing, and can communicate between the exhaust gas inlet and the exhaust gas outlet while bypassing the turbine rotor. A waste gate valve disposed in the bypass passage opens or closes the bypass passage to control the quantity of exhaust gas supplied to the inlet of the turbine rotor. A scroll chamber is formed in the turbine housing in the bypass passage. The scroll chamber opens into the exhaust gas outlet and has a circular opening oriented along the direction of a flow of exhaust gas discharged from the turbine rotor. A spiral groove is formed on an inner surface of a portion of the exhaust gas outlet located more downstream than the circular opening of the scroll chamber. The direction of the spiral groove is the same as that of the rotation of the turbine rotor.

4 Claims, 4 Drawing Sheets

WASTE GATE STRUCTURE OF A TURBOCHARGER

BACKGROUND OF THE INVENTION

1. Field of the Invention

The present invention relates to a waste gate structure of a turbocharger, and more particularly to a waste gate structure for controlling a boost pressure of a turbocharger for a vehicle's engine.

2. Description of the Prior Art

One example for a conventional waste gate structure of a turbocharger is disclosed in Japanese Patent Application Laid-Open Publication No. 54(1979)-19007. As shown in FIG. 4, this conventional waste gate structure includes a housing 102 in which a turbine rotor 101 is disposed and to which an exhaust manifold 103 and an exhaust gas outlet pipe 104 are connected, respectively. At the inlet side of the housing 102, namely, at the side of the housing 102 to which the exhaust manifold 103 is connected, a bypass hole 105 is formed thereon and is opened or closed by a bypass valve 107. The bypass valve 107 is driven by a control device 106 so that the bypass flow of the exhaust gas flowing into a bypass passage 107 is controlled in order to control the boost pressure. The bypass passage 107 is formed in the housing 102 so as to bypass the turbine rotor 101. One end of the bypass passage 108 is opened via the bypass hole 105 into the inlet side of the housing 102 in which the inlet side of the turbine rotor 101 is located. The other end of the bypass passage 108 is opened as an ejecting nozzle 109 into the outlet side of the housing 102 in which the outlet side of the turbine rotor 101 is located. The ejecting nozzle 109 has a circular shape and its opening is oriented along the direction of the main flow of the exhaust gas discharged from the turbine rotor 101. A bypass volute chamber 110 which constitutes a part of the bypass passage 108 is formed in the housing 102 so as to surround the ejecting nozzle 109. The sectional area or the volume of the bypass volute chamber 110 decreases along the rotational direction of the turbine rotor 101 successively, and the bypass involute chamber 110 communicates with the ejecting nozzle 109 running its whole circumference.

When the bypass valve 107 is opened in order to control the boost pressure and part of the exhaust gas discharged from an engine flows into the bypass volute chamber 110 through the bypass passage 108, the exhaust gas in the bypass volute chamber 110 is discharged from the ejecting nozzle 109 along the direction of the main flow of the exhaust gas discharged from the turbine rotor 101.

In the above conventional waste gate structure, there is a following drawback. As mentioned above, the part of the exhaust gas bypassing the turbine rotor 101 through the bypass passage 108 is discharged from the ejecting nozzle 109 in the axial direction so as to be the same as the direction of the main flow of the exhaust gas discharged from the turbine rotor 101. On the other hand, the exhaust gas discharged from the turbine rotor 101 flows spirally in the output side of the housing 102 and the exhaust output pipe 104. Consequently this spiral main flow of the exhaust gas from the turbine rotor 101 interferes with the bypass flow of the exhaust gas from the ejecting nozzle 109 and the exhaust pressure of the turbocharger. Specifically, the exhaust gas pressure of the outlet side of the turbine rotor 101 increases. As a result, the exhaust gas pressure of the inlet side of the turbine rotor 101 increases, and thereby the efficiency of the turbocharger decreases.

SUMMARY OF THE INVENTION

It is, therefore, an object of the present invention to provide an improved waste gate structure for a turbocharger which overcomes the above drawback in the prior art.

It is another object of the present invention to provide a waste gate structure for a turbocharger that can improve the efficiency of the turbocharger.

In order to achieve these objectives, there is provided a waste gate structure for a turbocharger which includes a turbine housing in which a turbine rotor rotated by exhaust gas is disposed therein. An exhaust gas inlet is formed in the turbine housing and communicates with an inlet of the turbine rotor. An exhaust gas outlet is formed in the turbine housing and communicates with an outlet of the turbine rotor. A bypass passage is formed in the turbine housing and can communicate between the exhaust gas inlet and the exhaust gas outlet, while bypassing the turbine rotor. A waste gate valve is disposed in the bypass passage, and opens or closes the bypass passage in order to control the quantity of exhaust gas supplied to the inlet of the turbine rotor. A scroll chamber is formed in the turbine housing so as to be located in the bypass passage. The scroll chamber opens into the exhaust gas outlet, and has a circular opening oriented along the direction of a flow of exhaust gas discharged from the turbine rotor. A spiral groove is formed on an inner surface of a portion of the exhaust gas outlet located at the more downstream side than the circular opening of the scroll chamber. The direction of the spiral groove is the same as that of the rotation of the turbine rotor.

BRIEF DESCRIPTION OF THE DRAWINGS

Additional objects and advantages of the present invention will become more apparent from the following detailed description of a preferred embodiment thereof when considered with reference to the attached drawings, in which.

DESCRIPTION OF THE PREFERRED EMBODIMENTS

A waste gate structure of a turbocharger constituted in accordance with a preferred embodiment of the present invention will be described with reference to the attached drawings.

Figure 1:
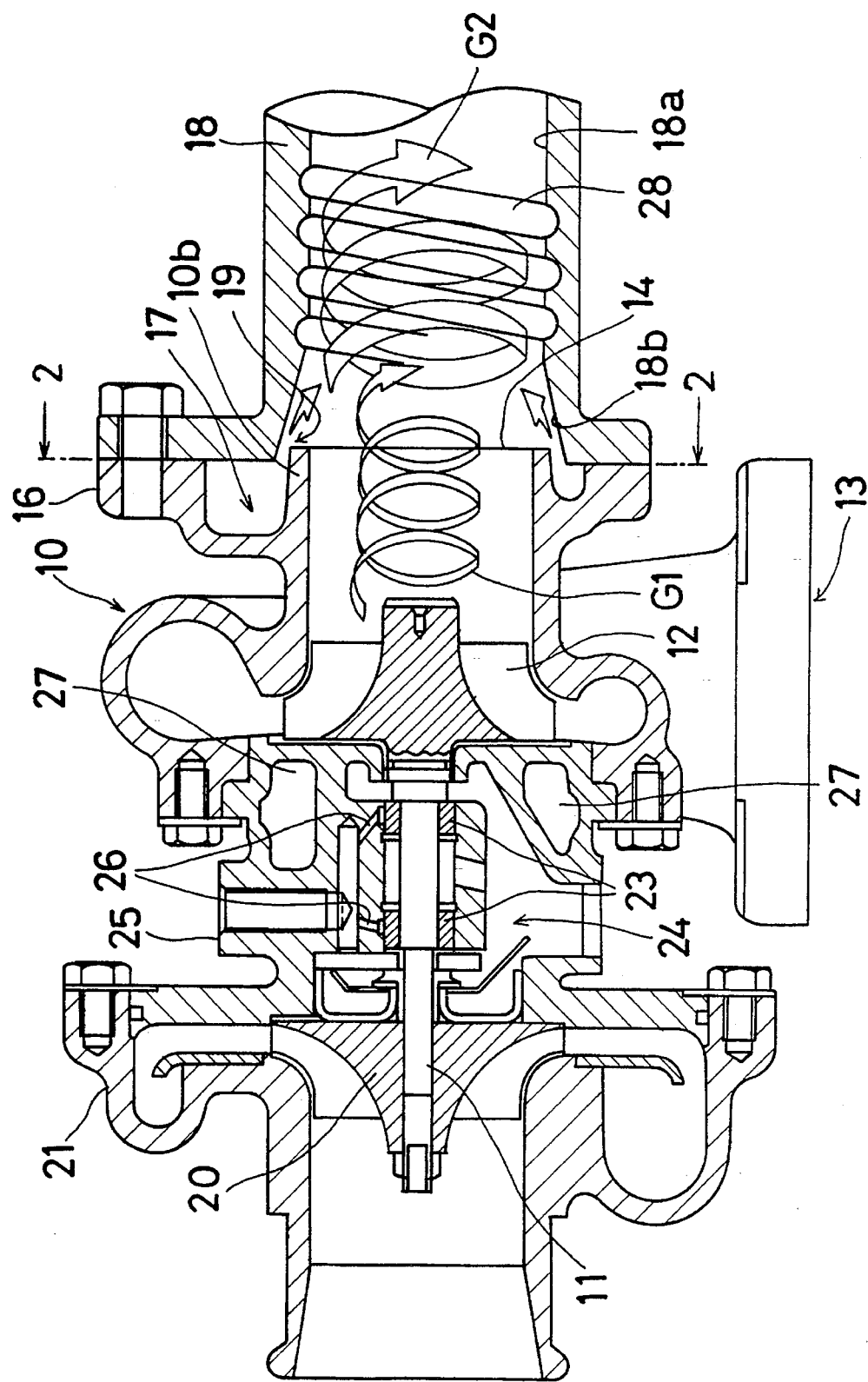
FIG. 1 is a longitudinal sectional view of an embodiment of a waste gate structure for a turbocharger in accordance with the present invention.

Referring to FIG. 1, a shaft 11 is rotatably supported on a bearing housing 25 through bearings 23. In a bearing housing 25, oil holes 26 for supplying oil to the bearings 23 and cooling water passages 27 for cooling the bearing housing 25 are formed therein, respectively. A turbine housing 10 is fixed to the bearing housing 25, and a turbine rotor 12 fixed to one end of the shaft 11 is disposed in the turbine housing 10. The turbine housing 10 has an exhaust gas inlet 13 and an exhaust gas outlet 14. The exhaust gas inlet 13 communicates with an exhaust manifold of an engine (not shown) and an inlet of the turbine rotor 12. The exhaust gas outlet 14 communicates with an exhaust gas outlet pipe 18 and an outlet of the turbine rotor 12. The turbine housing 10 is provided with a flange portion 16 and is fixed to the exhaust gas outlet pipe 18 through the flange portion 16. At the other end of the shaft 11, a compressor rotor 20 is fixed thereto and is disposed in a compressor housing 21 which is fixed to the bearing housing 25. The compressor housing 21 has an air inlet and an air outlet. The air inlet communicates with an air inlet duct (not shown) and an inlet of the compressor rotor 20. The air outlet communicates with an intake manifold of the engine (not shown) and an outlet of the compressor rotor 20. An oil seal mechanism 24 is interposed between the bearing 23 and the compressor rotor 20.

Figure 2:
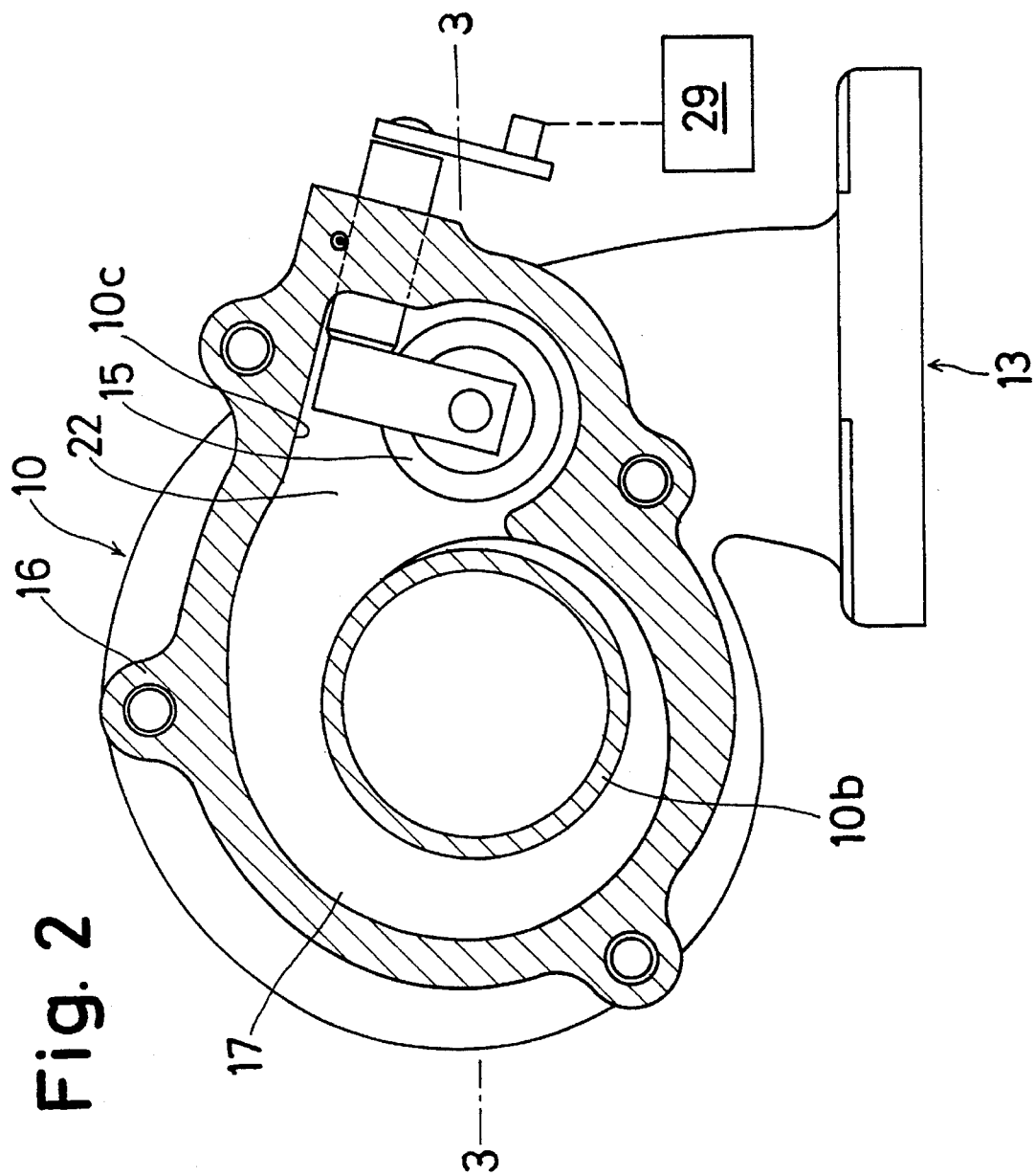
FIG. 2 is a sectional view taken substantially along the line 2—2 of FIG. 1.
Figure 3:
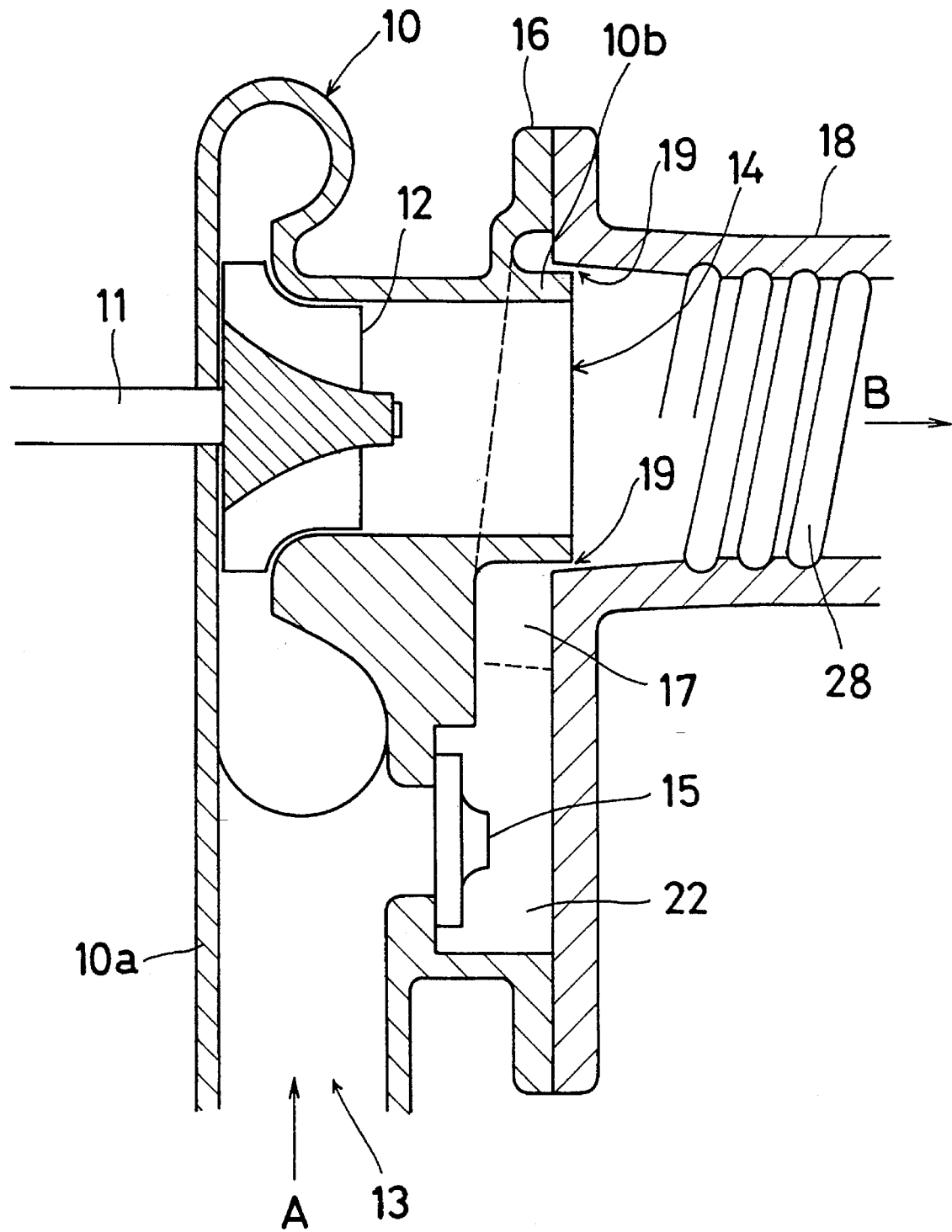
FIG. 3 is a sectional view taken substantially along the line 3—3 of FIG. 2.
Figure 4:
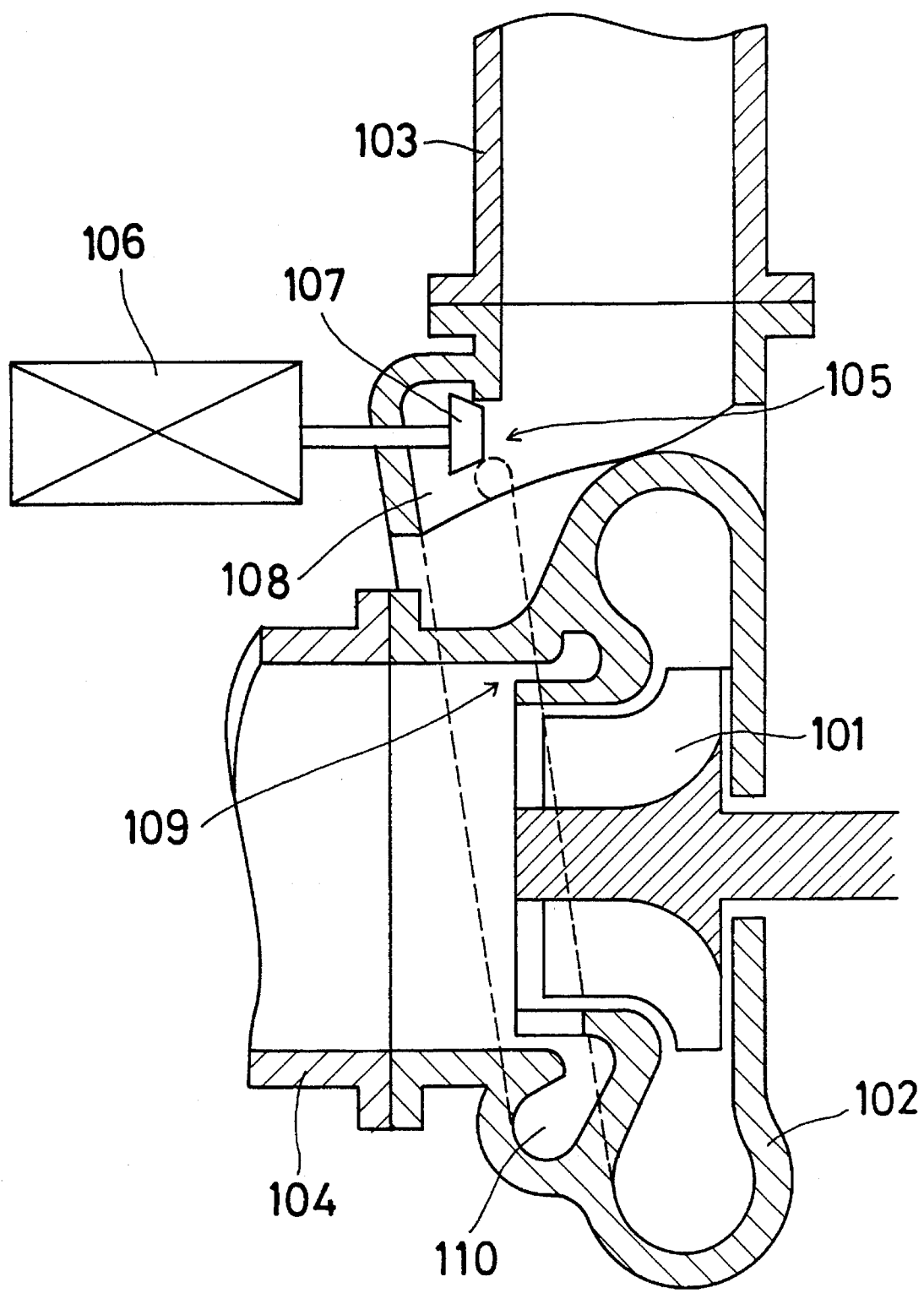
FIG. 4 is a sectional view of a waste gate structure for a turbocharger in the prior art.

Referring to FIG. 2 and FIG. 3, a bypass passage 22 which can communicate between the exhaust gas inlet 13 and the exhaust gas outlet 14 while bypassing the turbine rotor 12 is formed between the turbine housing 10 and the exhaust gas outlet pipe 18. One end of the bypass passage 22 opens into a inlet passage portion 10a of the turbine housing 10 between the inlet of the turbine rotor 12 and the exhaust gas inlet 13. As shown in FIG. 2, a groove 10c is formed on an opposite end surface of the turbine housing 10 to the exhaust gas outlet pipe 18. The groove 10c includes a scroll groove portion that forms a cylindrical portion 10b in the turbine housing 10. The sectional area of the scroll groove portion decreases along the rotational direction of the turbine rotor 12 successively. As mentioned above, with the exhaust gas outlet pipe 18 fixed to the turbine housing 10, the bypass passage 22 is formed therebetween, and a scroll chamber 17 is formed as part of the bypass passage 22.

As shown in FIG. 1, the exhaust gas outlet pipe 18 is provided with an inner bore 18a which has a cone-shaped portion 18b at one end side. The cone-shaped portion 18b makes the diameter of the inner bore 18a gradually increase toward the turbine housing 10. The cylindrical portion 10b of the turbine housing 10 projects into the cone-shaped portion 18b of the exhaust gas outlet pipe 18 so as to form a circular opening that functions as a nozzle (i.e., an ejecting nozzle) 19 between the cylindrical portion 10b and the inner surface of the cone-shaped portion 18b. The nozzle 19 communicates with the scroll chamber 17.

A waste gate valve 15 is disposed in the bypass passage 22 as shown in FIG. 2 and FIG. 3. The waste gate valve 15 opens and closes that one end of the bypass passage 22 by means of a control device 29, so that the bypass flow of the exhaust gas flowing into a bypass passage 22 is controlled thereby controlling the boost pressure. In particular, when the waste gate valve 15 opens the bypass passage 22, part of the exhaust gas supplied to the exhaust gas inlet 13 flows into the bypass passage 22. Since the sectional area or the volume of the scroll chamber 17 gradually decreases as the distance from the one end of the bypass passage 22 increases, the velocity of the bypass flow of the exhaust gas efficiently increases by means of the scroll chamber 17. Consequently, the exhaust gas uniformly flows into the exhaust gas outlet pipe 18 along the inner circumferential surface of the inner bore 18a from the whole circumference of the nozzle 19 so as to swirl in the exhaust gas outlet pipe 18. The direction of this swirl is the same as the rotational direction of the turbine rotor 12. As mentioned above, since the nozzle 19 is formed by the turbine housing 10 and the exhaust gas outlet pipe 18, it is not necessary to add extra parts in order to form the nozzle 19. Furthermore, the outlet of the exhaust gas outlet pipe does not decrease. As shown in FIG. 1 and FIG. 3, a spiral groove 28 whose direction is the same as that of the rotation of the turbine rotor 12 is formed on the inner circumferential surface of the inner bore 18a of the exhaust gas outlet pipe 18.

The above-described embodiment operates as follows:

When the engine (not shown) is started, the turbocharger begins to supercharge the engine. Namely, the exhaust gas flows into the exhaust gas inlet 13 making the turbine rotor 12 rotate. The compressor rotor 20 then rotates through the shaft 11 so that air is supercharged. The exhaust gas which drove the turbine rotor 12 becomes a spiral flow G1 as shown in FIG. 1, and is discharged from the exhaust gas outlet 14 into the exhaust gas outlet pipe 18 so as to swirl. In this condition, the waste gate valve 15 closes the bypass passage 22. As a result, the rotational direction of this spiral flow G1 is the same as that of the turbine rotor 12.

When the rotational Speed of the engine and the turbine rotor 12 increases whereby the boost pressure of the engine exceeds a predetermined value, the waste gate valve 15 is driven and opens the bypass passage 22. A part of the exhaust gas supplied to the exhaust gas inlet 13 then always flows into the exhaust gas outlet pipe 18 from the nozzle 19 through the bypass passage 22, while bypassing the turbine rotor 12. As a result, the boost pressure is maintained at a constant value (i.e., the predetermined value).

By the actions of the scroll chamber 17 and the nozzle 19, the exhaust gas discharged into the bypass passage 22 is compressed, and the velocity of its flow increases. Then, the exhaust gas is discharged from the nozzle 19 into the exhaust gas outlet pipe 18. In this condition, since the velocity of the exhaust gas discharged from the turbine rotor 12 is lower than that of the exhaust gas discharged from the nozzle 19, the exhaust gas discharged from the turbine rotor 12 is sucked out by an ejection effect. Furthermore, the exhaust gas discharged from the nozzle 19 along the inner circumferential surface of the inner bore 18a of the exhaust gas outlet pipe 18 flows along the spiral groove 28 in the exhaust gas outlet pipe 18, and becomes a spiral flow G2 as shown in FIG. 1. Since the rotational direction of this spiral flow G2 is the same as that of the spiral flow G1 of the exhaust gas discharged from the turbine rotor 12, spiral flows G1 and G2 do not interfere with each other. Consequently, the above mentioned suctioning of the exhaust gas discharged from the turbine rotor 12 is more efficiently done.

As mentioned above, according to this embodiment, the flow of the exhaust gas in the exhaust gas outlet pipe 18 becomes smooth, and thereby the pressure of the exhaust gas in the exhaust gas outlet 14 and the exhaust gas outlet pipe 18 decreases. Accordingly, the pressure of the exhaust gas in the exhaust gas inlet 13 decreases, thereby improving the efficiency of the turbocharger.

In the above-mentioned embodiment, the exhaust gas outlet pipe 18 is fixed to the turbine housing 10. However, it is possible to integrate the turbine housing and the exhaust gas outlet pipe into a one-piece construction.

In conventional turbochargers, the diameter of the turbine rotor was designed to decrease in order to improve the efficiency of the turbocharger at low rotational speeds of the engine. At high rotational speeds, however, the pressure of the exhaust gas discharged from the engine increases, thereby causing a decrease in the performance of the turbocharger.

Consequently, there was a limit to the amount that the diameter of the turbine rotor could be reduced. Therefore, further improvements in the performance of the turbocharger could not be expected with that design technique.

According to the present invention, since the bypass flow of the exhaust gas discharged from the nozzle becomes a spiral flow with a high velocity and whose rotational direction is the same as the main flow of the exhaust gas discharged from the turbine rotor, the main flow of the exhaust gas is efficiently sucked out by the bypass flow. Accordingly, the pressure of the exhaust gas at the outlet of the turbine rotor decreases, whereby the pressure of the exhaust gas at the outlet of the turbine rotor also decreases. As a result, since it then becomes possible to decrease the diameter of the turbine rotor in order to improve the performance of the turbocharger at low rotational speeds of the engine without lowering of performance of the turbocharger to improve the performance of the turbocharger over the entire spectrum of rotational speeds of the engine.

The principles, a preferred embodiment and modes of operation of the present invention have been described in the foregoing description. The invention which is intended to be protected herein should not, however, be construed as limited to the particular forms disclosed, as these are to be regarded as illustrative rather than restrictive of the invention. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A waste gate structure for a turbocharger, comprising:

a turbine housing having a turbine rotor rotated by exhaust gas, said turbine housing having defined therein an inlet to and an outlet from the turbine rotor;

an exhaust gas inlet defined on the turbine housing and formed to communicate with the inlet to the turbine rotor;

an exhaust gas outlet defined on the turbine housing and formed to communicate with the outlet from the turbine rotor;

a bypass passage formed on the turbine housing and defined to allow communication between the exhaust gas inlet and the exhaust gas outlet while bypassing the turbine rotor;

a waste gate valve located in the bypass passage, the waste gate valve having means for opening and closing the bypass passage to control a quantity of exhaust gas supplied to the inlet of the turbine rotor;

a scroll chamber formed on the turbine housing in the bypass passage, the scroll chamber having a circular opening positioned along a direction of flow of exhaust gas discharged from the turbine rotor; and a spiral groove formed on an inner circumferential surface of the exhaust gas outlet, the spiral groove being positioned downstream of the circular opening of the scroll chamber in the exhaust gas outlet, and a direction of the spiral groove being defined to be the same as a direction of rotation of the turbine rotor.

2. A waste gate structure as claimed in claim 1, wherein the circular opening of the scroll chamber is defined open along the inner circumferential surface of the exhaust gas outlet.

3. A waste gate structure for a turbocharger, comprising:

a turbine housing having a turbine rotor rotated by exhaust gas, said turbine housing having defined therein an inlet to and an outlet from the turbine rotor;

an exhaust gas inlet defined on the turbine housing and formed to communicate with the inlet to the turbine rotor;

an exhaust gas outlet defined on the turbine housing and formed to communicate with the outlet from the turbine rotor;

a bypass passage formed on the turbine housing and defined to allow communication between the exhaust gas inlet and the exhaust gas outlet while bypassing the turbine rotor;

a waste gate valve located in the bypass passage, the waste gate valve having means for opening and closing the bypass passage to control a quantity of exhaust gas supplied to the inlet of the turbine rotor;

an exhaust gas outlet pipe connected to the exhaust gas outlet formed on the turbine housing;

a scroll chamber formed in the turbine housing and in the bypass passage, the scroll chamber being defined to open into the exhaust gas outlet and the exhaust gas outlet pipe, the scroll chamber having a circular opening positioned along a direction of flow of exhaust gas discharged from the turbine rotor; and a spiral groove formed on an inner circumferential surface of the exhaust gas outlet pipe, wherein a direction of the spiral groove is defined to be the same as a direction of rotation of the turbine rotor.

4. A waste gate structure as claimed in claim 3, wherein the circular opening of the scroll chamber is defined open along the inner circumferential surface of the exhaust gas outlet pipe.

* * * * *